(12) United States Patent
Shan et al.

(10) Patent No.: US 8,543,924 B2
(45) Date of Patent: Sep. 24, 2013

(54) CONTEXTUAL-DISPLAY ADVERTISEMENT

(75) Inventors: Ying Shan, Sammamish, WA (US); Ying Li, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 854 days.

(21) Appl. No.: 12/043,543

(22) Filed: Mar. 6, 2008

(65) Prior Publication Data

US 2009/0228802 A1 Sep. 10, 2009

(51) Int. Cl.
*G09G 5/00* (2006.01)

(52) U.S. Cl.
USPC .......................... 715/738; 715/715

(58) Field of Classification Search
USPC .................................. 715/738, 715
See application file for complete search history.

(56) References Cited

U.S. PATENT DOCUMENTS

| | | | |
|---|---|---|---|
| 2003/0048294 A1* | 3/2003 | Arnold | 345/738 |
| 2005/0033771 A1 | 2/2005 | Schmitter | |
| 2006/0179453 A1 | 8/2006 | Kadie | |
| 2006/0212897 A1 | 9/2006 | Li | |
| 2006/0242663 A1 | 10/2006 | Gogerty | |
| 2006/0287920 A1 | 12/2006 | Perkins | |
| 2007/0038614 A1 | 2/2007 | Guha | |
| 2007/0083611 A1 | 4/2007 | Farago | |
| 2007/0124200 A1 | 5/2007 | Simons | |
| 2007/0192164 A1 | 8/2007 | Nong | |
| 2007/0288454 A1 | 12/2007 | Bolivar | |
| 2008/0004959 A1 | 1/2008 | Tunguz-Zawislak et al. | |

FOREIGN PATENT DOCUMENTS

| | | |
|---|---|---|
| KR | 2004-0087233 A | 10/2004 |
| WO | 2006069445 A1 | 7/2006 |

OTHER PUBLICATIONS

Andrei Broder, A Semantic Approach to Contextual Advertising, http://portal.acm.org/citation.cfm?id=1277837, Amsterdam, Netherlands, Jul. 2007.
Aris Anagnostopoulos, Just-in-Time Contextual Advertising, http://portal.acm.org/citation.cfm?id=1321488, Lisboa, Portugal, Nov. 2007.
International Searching Authority; International Application No. PCT/US2009/032915; Patent Cooperation Treaty, Aug. 20, 2009, 12 pages.

* cited by examiner

*Primary Examiner* — Daniel Felten
(74) *Attorney, Agent, or Firm* — Shook, Hardy & Bacon L.L.P.

(57) ABSTRACT

Methods and computer storage media for creating contextual-display advertisements are provided. A request for a contextual-display advertisement to be presented on a page is received. Upon receiving the request, the page is evaluated to determine the context of the page so that the resulting advertisement is contextually related to the requesting page. The contextually related text and base image are extracted from their respective database to be merged into a contextual-display advertisement. The visual characteristics of the advertisement text are manipulated to provide visual congruity among the elements of the advertisement. Additionally, the placement of the text on the base image is optimized to provide a contextual-image advertisement that is then rendered to be presented on the requesting page.

7 Claims, 7 Drawing Sheets

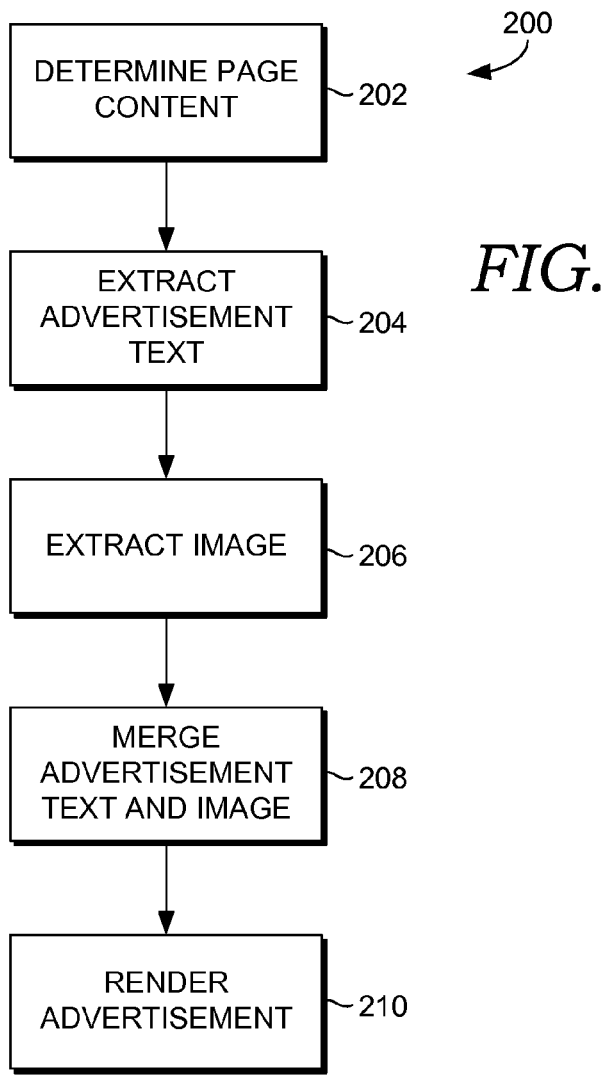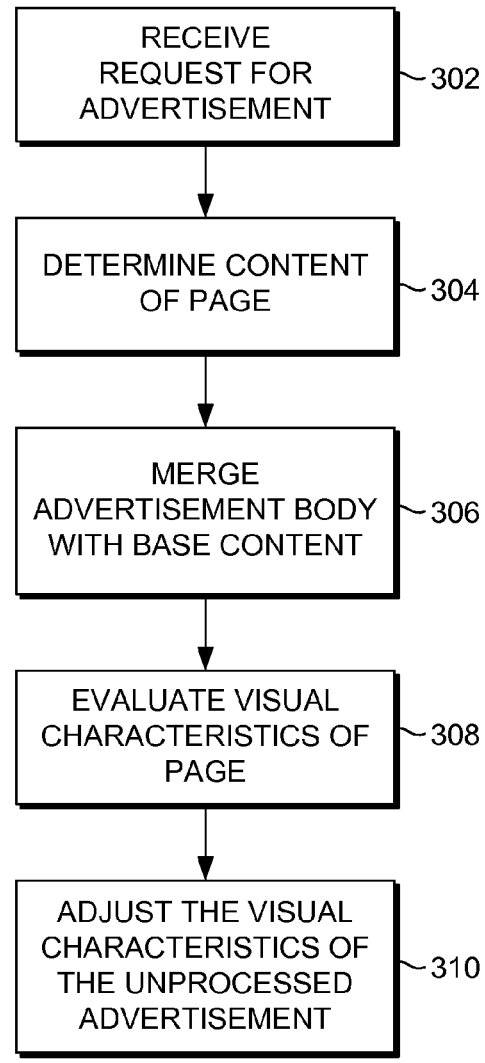

CONTEXTUAL-DISPLAY ADVERTISEMENT

BACKGROUND

Traditionally, when an advertisement, that includes both graphical and textual elements, is presented, that advertisement was created prior to the request for the advertisement and with graphical and textual elements that were specifically selected and/or purchased for that advertisement. The process of creating these advertisements generally utilizes the skill of graphic artists or marketing personal to select and create the various elements of the advertisement. The time and expense associated with advertisements that are comprised of both graphical and textual elements traditionally precludes some advertisers from utilizing this type of advertising. Additionally, online marketing has typically included advertising that utilizes textual elements only, but the text based advertisements lack the visual appeal provided by advertisements that include graphical elements.

SUMMARY

Embodiments of the present invention relate to methods and computer storage media for creating contextual-display advertisements. A request is received for a contextual-display advertisement to be presented on a page. Upon receiving the request, the context of the requesting page is determined so that contextually related advertisement text and base images are extracted from their respective databases. The advertisement text and base image are manipulated to optimize the position and visual congruity relative to each other. The advertisement text and base image are rendered as a contextual-display advertisement that is contextually related to the requesting page.

This Summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWING

Embodiments are described in detail below with reference to the attached drawing figures, wherein:

FIG. 2 is a flow diagram of an exemplary method for creating a contextual-display advertisement, in accordance with an embodiment of the present invention;

FIG. 3 is a flow diagram of an exemplary method for creating a contextual-display advertisement, in accordance with an embodiment of the present invention;

DETAILED DESCRIPTION

Figure 1:
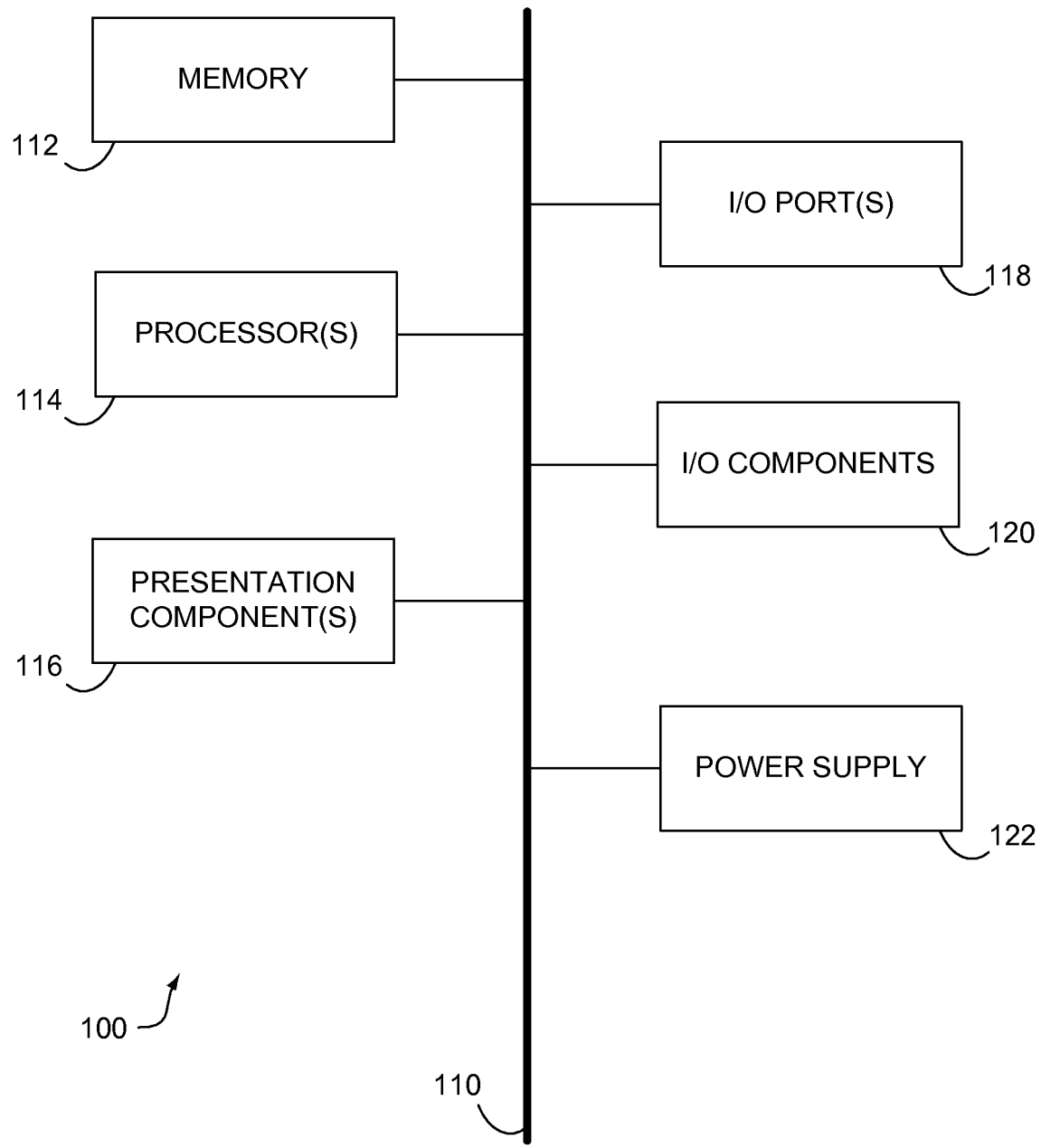
FIG. 1 is a block diagram of an exemplary computing environment suitable for implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to methods and computer storage media for creating contextual-display advertisements. A request is received for a contextual-display advertisement to be presented on a page. Upon receiving the request, the context of the requesting page is determined so that contextually related advertisement text and base images are extracted from their respective databases. The advertisement text and base image are manipulated to optimize the position and visual congruity relative to each other. The advertisement text and base image are rendered as a contextual-display advertisement that is contextually related to the requesting page.

Accordingly, in one aspect, the present invention provides a method for creating a contextual-display advertisement. The method comprises determining the context of a page containing an advertising space, extracting at least one advertisement text(s) from a plurality of advertisement texts, wherein the at least one advertisement text(s) has a logical relationship to the context of the page. The method additionally comprises extracting at least one image(s) from a plurality of images, wherein the at least one image(s) has a logical relationship to the context of the page, merging one of the at least one advertisement text(s) with one of the at least one image(s) to create a merged advertisement, and rendering an advertisement to be displayed in the advertising space based on the merged advertisement.

In another aspect, the present invention provides one or more computer storage media having computer-executable instructions embodied thereon that, when executed, perform a method for generating contextual display advertisements. The method comprises receiving a request for a contextual display advertisement to be provided to a page, determining the context of the page, merging one of a plurality of advertisement bodies with one of a plurality of base contents to form an unprocessed advertisement, wherein the unprocessed advertisement contextually relates to the page. The method further comprises evaluating the visual characteristics of the page and adjusting the visual characteristics of the unprocessed advertisement to provide congruity between the page and the unprocessed advertisement to create a contextual-display advertisement.

In another aspect, the present invention provides one or more computer storage media having computer-executable instructions embodied thereon that, when executed, perform a method for generating contextual-display advertisements. The method comprising receiving a request for a display advertisement to be displayed on a page in an advertisement space, determining the context of the page, wherein the context of the page is classified into one or more keywords and/or categories, determining dimensional limitations of the advertisement space, evaluating the visual characteristics of the page, extracting at least one advertisement text body from a plurality of advertisement text bodies, wherein the at least one advertisement text body is logically related to the context of the page, extracting at least one base image from a plurality of base images, wherein the at least one base image is logically related to the context of the page and the at least one base image is scalable to satisfy the dimensional limitations of the advertisement space, generating at least one unprocessed advertisement, wherein the at least one unprocessed advertisement is the combination of the at least one base image and the at least one text body, optimizing the placement of the at least one text body in relation to the at least one image base of the at least one unprocessed advertisement with a placement template, adjusting the visual characteristics of the at least one unprocessed advertisement to increase the visual congruity between the page and the at least one unprocessed advertisement, and rendering the unprocessed advertisement to create a contextual-display advertisement.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier waves or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 8:
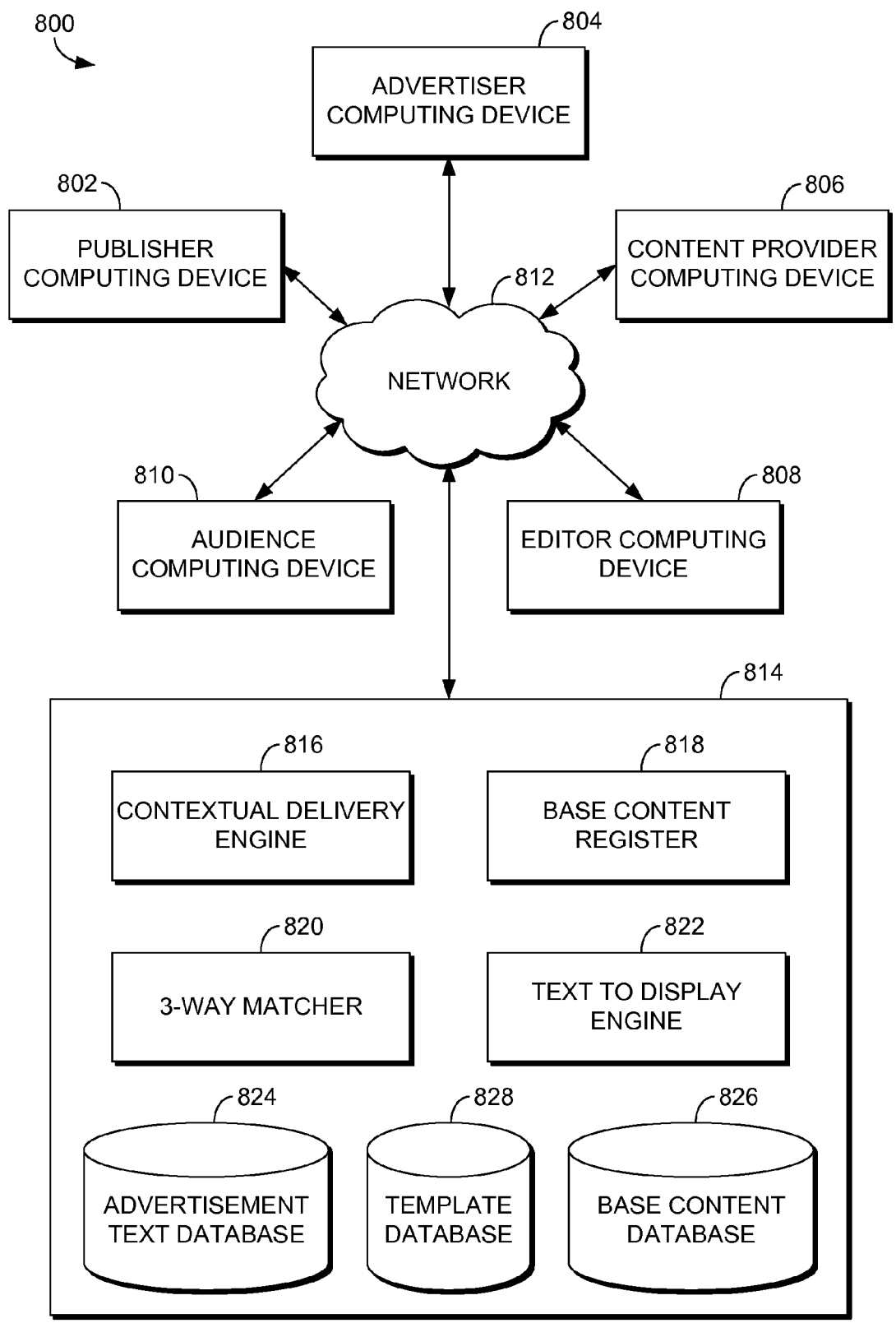
FIG. 8 is a block diagram of an exemplary contextual-display advertisement system, in accordance with an embodiment of the present invention.

With reference to FIG. 8, a block diagram is shown that illustrates an exemplary system suitable for implementing embodiments of the present invention as shown and designated generally as contextual-display advertisement system 800, in accordance with an embodiment of the present invention. A contextual-display advertisement is an advertisement comprised of at least one graphical element that is visually perceivable and at least one textual element that is interpretable. In an exemplary embodiment, the graphical element and the textual element are merged in real-time, without human intervention, to form the contextual-display advertisement. Contextual-display advertisement system 800 is but one example of a suitable contextual-display advertisement system and is not intended to suggest any limitations as to the scope of functionality of the present invention. Neither should contextual-display advertisement system 800 be interpreted to have any dependency or requirements relating to any one or combination of components, devices, nor elements illustrated in association with contextual-display advertising system 800.

Contextual-display advertising system 800 includes a publisher computing device 802, an advertiser computing device 804, a content provider computing device 806, an editor computing device 808, an audience computing device 810, and a contextual-display advertisement device 814, all connected to a network 812. Network 812 includes, without limitation, one or more local area networks (LANs) and/or wide area networks (WANs). Such networking environments are commonplace in offices, residential networks, intranets, and the Internet. Accordingly, the network 812 is not further described herein.

In an exemplary embodiment of the present invention the publisher computing device 802, the advertising computing device 804, the content provider computing device 806, the editor computing device 808, the audience computing device 810, and the contextual-display advertisement device 814 are each a computing device as represented by computing device 100 previously described in relation to FIG. 1.

Publisher computing device 802 is a computing device that is utilized by a publisher of online content to store, transmit, and/or build the online content that is accessible through network 812 to audience computing device 810. Online content may include, but not limited to, web pages (e.g., .html, .asp, .php, .xml, .cfm), documents, files, pictures, videos, audio files, computing applications, and similar content that is used by audience computing devices. Online content that is accessible through a network and is capable of presenting a contextual-display advertisement is a page. For example, a page is something that is published on publisher computing device 802 that includes a document, images, audio, and a space for advertising. The advertising space of the page is generally a defined area of the page that is not otherwise utilized by other online content. However, the advertising space may include the entire page, or the advertising space may float or be incorporated on top of or into the online content of the page.

Advertising computing device 804 is a computing device that provides advertisement bodies to online advertisers. An advertisement body or multiple bodies includes the textual elements of an advertisement. The advertisement body also includes metadata describing the elements that comprise the advertisement body. The metadata may describe the relevant categories, keywords, time constraints, publisher constraints, content constraints, rendering information, and general information describing the advertisement body. For example, an online advertiser creates an advertisement body for a sale at the online advertiser's website. The advertisement body includes the text of the advertisement, the network location or Universal Resource Locator (URL) to access the sale information, a title for the advertisement, and a size constraint that limits the resulting advertisement to an advertisement space of a specified size. In an alternative exemplary embodiment, the advertising computing device is an online advertising service that aggregates advertisement bodies and manages an online advertising portfolio for clients.

Content provider computing device 806 is a computing device that provides base content to be used in advertising. Base content is the visual portion of an advertisement which includes, but is not limited to, static images, dynamic images, three-dimensional visualizations, videos, movies, and animations. A static image is an image that does not have visual characteristics that change over time, while a dynamic image is an image that has visual characteristics that change over time. In an exemplary embodiment, a content provider computing device provides images that are intended to be used in association with online advertising. For example, a free-lance photographer take multiple photos of an item that may be the subject of an advertisement and the content provider computing device makes those images available through a network to advertisers that wish to include visual elements in an advertisement. In an exemplary embodiment of the present invention the base content is provided by a content provider for the use of any advertiser and the rights to that base content are not directly negotiated among the content provider and the advertiser. For example, a free-lance photographer submits multiple images that are to be used as base content. The images submitted are not exclusively reserved or used by a defined group or individual advertiser, instead the images are available for any contextual-display advertisement for which the images would be a suitable element.

Editor computing device 808 is a computing device that provides templates that in an exemplary embodiment, are used when merging advertisement bodies and base content into an unprocessed advertisement. A template may be used to optimize the placement of the advertisement text over or on the underlying base content. The templates that are provided by an editor computing device may be developed for specific base content, specific advertisement bodies, or they may be generated as a generic template that is not directly associated with a specific element of an advertisement. The templates may be created by editors, people who generate templates for the purpose of use on contextual-display advertisements, or they may be created by the editor computing device based on computing logic that optimizes specified constraints. Further examples of templates that may be provided by the editor computing device include templates that define the location and area that is used by the advertisement text, the location and area used by the title of the advertisement text, the location and space of the URL to be displayed, and the templates may also define characteristics of the elements as positioned by the template. Examples of characteristics include visual characteristics such as color, size, font, effects, and alterations to the title, advertisement text, and/or URL.

Audience computing device 810 is a computing device the presents a page and an associated context-display advertisement. In an exemplary embodiment, the audience computing device requests a page to view, the page is transmitted to the audience computing device through network 812, the page includes an advertising space that is populated, in real-time, with a contextual-display advertisement. The audience computing device may be any computing device that requests, accesses, and/or presents a page. For example, the audience computing device may be, but is not limited to, a handheld computing device, a cellular phone, a global positioning device, a personal computer, a server, a radio receiver, a video displayer, an electronic billboard, or another device that is capable of presenting a contextual-display advertisement. In an exemplary embodiment of the present invention, the contextual-display advertisement is generated in real-time or near real-time to the request for the page. For example, an advertising space or place holder is included on a webpage, each time the webpage is requested a contextual-display advertisement is generated and presented in the advertising space for the audience computing device that requested the page. Additionally, in a further exemplary embodiment, once a contextual-display advertisement has been created for a page, that same contextual-display advertisement may be loaded into the advertising space of the page in order to provide efficiency to the system.

Contextual-display advertisement device 814 is graphically represented in FIG. 8 as comprising a contextual delivery engine 816, a base content register 818, a 3-way matcher 820, a text to display engine 822, an advertisement text database 824, a base content database 826, and a template database 828. For the sake of convenience contextual-display advertisement device 814 is visually depicted as containing the various components, but it is understood and appreciated by those skilled in the art that the various components, devices, and modules represented in contextual-display advertisement device 814 may be independent or connected through a network, such as network 812.

In an exemplary embodiment, contextual-display advertisement device 814 utilizes the page provided by the publisher computing device 802, the advertising body provided by the advertising computing device 804, the base content provided by the content provider computing device 806, and the templates provided by the editor computing device 808 to generate a contextual-display advertisement that is presented to the audience computing device 810. It is understood and appreciated by those skilled in the art that the contextual-display advertisement device 814 may use any and all combinations of page information, advertisement bodies, base content, and templates to create the contextual-display advertisements.

Contextual delivery engine 816 evaluates a page that contains an advertising space that will be populated with a contextual-display advertisement to determine the context of that page. The context of a page describes the meaning, themes, categories, and/or keywords of that page. The determination of the context of a page allows for a contextual-display advertisement to be created that is relevant and logically related to the contents of the page. For example, if a webpage contains information on a professional football team, the contextual delivery engine would evaluate the webpage and determine that the contents of the webpage relate to football and a particular football team, the "Little Chiefs". Therefore, the contextual delivery engine may associate categories to that page that relate to "football", the "Little Chiefs", "tickets", and "Little Chiefs merchandise". Additionally, the contextual delivery engine may assign keywords such as "football", "tickets", and "Little Chiefs" to the webpage. In the above example, the context or meaning of the webpage is determined by the contextual delivery engine to provide categories and keywords that are used by the contextual-display advertisement device 814 to create a relevant contextual-display advertisement to present with the webpage, but it is understood and appreciated by those skilled in the art that the context of a page may be defined by more than categories and keywords. The context of a page may be determined by the interpreting the text of the page, the metadata of a page, the URL of the page, or a human determined context. It is appreciated and understood by those skilled in the art that the context of a page may be determined a variety of ways, and the above mentioned means are merely exemplary and not to be considered limiting on the manner of determining the context of a page.

In an exemplary embodiment of the present invention, the base content and the advertisement bodies are contextually selected based on information from the uniform resource locator of the Advertiser's landing page, the advertisement description, and keywords. For example, the Advertiser's landing page can be crawled to determine the context of that landing page, wherein that context will be used to in the selection of the advertisement bodies and base content. In an alternative exemplary embodiment, the advertisement text and the base content are selected based on information of the receiving audience. Wherein, the information on the receiving audience is provided by an audience intelligence agent. It is understood and appreciated by those skilled in the art that any combination of the elements indicated above may be utilized to extract the appropriate base content and advertisement text for a contextual-display advertisement.

A contextual-display advertisement is advantageous over a random display advertisement because the advertisement is related to the underlying content of the page on which the advertisement is displayed. A random display advertisement does not have a contextual or a logical relationship that is determined at the time of request, instead the random image advertisement is randomly selected from a predetermined selection of pre-defined display advertisements. The contextual relationship among the page and the advertisement provides better opportunities for an advertisement to be displayed to a targeted audience. Because of this, the context, which includes the content, of the page is determined to better match a display advertisement to a page.

Figure 6:
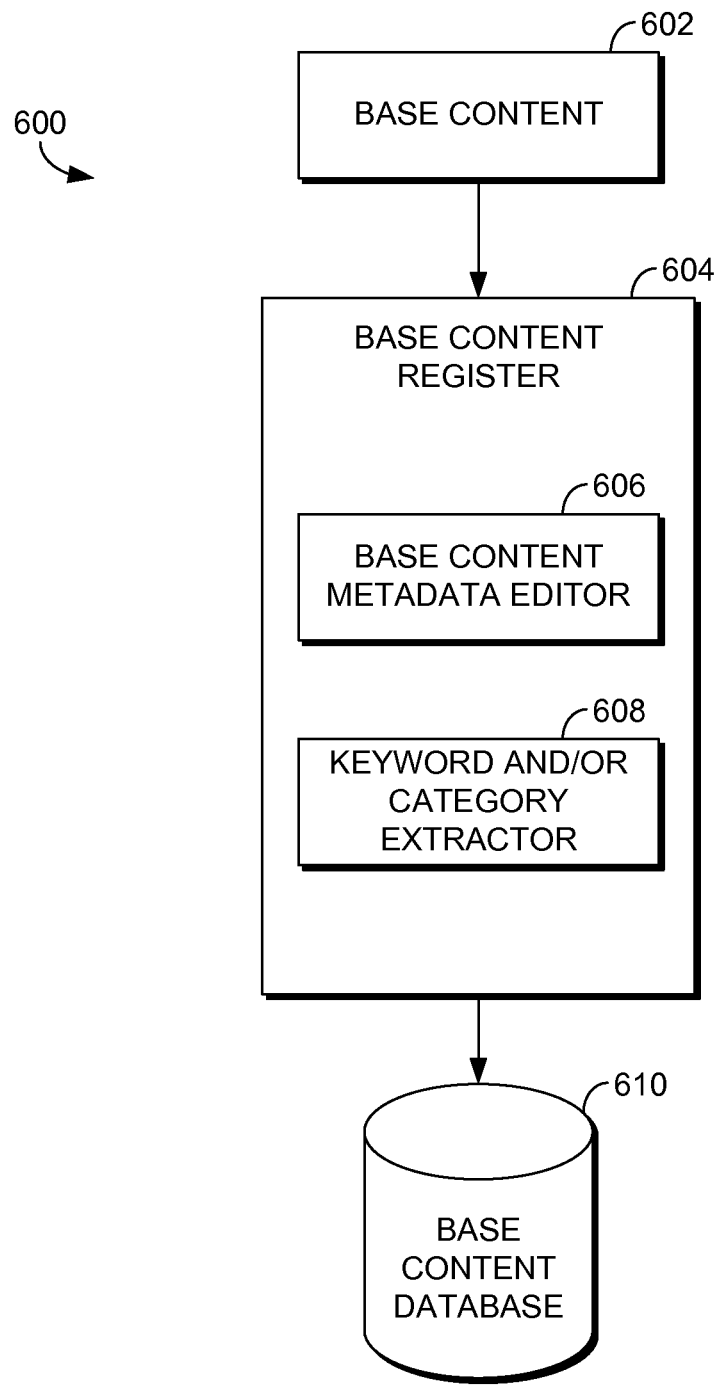
FIG. 6 is a block diagram of an exemplary base content register system, in accordance with an embodiment of the present invention.

Base content register 818 receives the base content provided by the content provider computing device 806. With reference to FIG. 6, a block diagram is shown that illustrates an exemplary system suitable for implementing embodiments of the base content register as shown and designated generally as base content register system 600, in accordance with an embodiment of the present invention. The base content 602 is provided to the base content register 604. The base content register 604 is comprised of a base content metadata editor 606 and a keyword and/or category extractor 608.

In an exemplary embodiment the base content metadata editor 606 specifies the areas and/or regions of the base content that are suitable for advertisement body placement. For example, a base content of an image depicting a single palm tree that is located on the extreme right side of an otherwise bare island is provided to the base content register 604, the base content metadata editor evaluates the tropical island base content image and determines that the advertisement body may be placed or merged into the base content in a defined region to the left of the palm tree. The base content metadata editor 606, in this example, then generates metadata associated with the base content, wherein the metadata signifies where the advertisement body may be positioned and/or merged. It is understood and appreciated by those skilled in the art that the base content editor 606 may be performed by a computing device or a human. Additionally, the determination of suitable regions for placement of the advertisement body/text may be done according to a set of rules that dictates what dimensional portions of the base content may or may not be suitable advertisement text placement regions.

Further, the base content register 604 is also comprised of a keyword and/or category extractor 608. In an exemplary embodiment, the keyword and/or category extractor 608 functions similar to the contextual delivery engine 816, of FIG. 8. The keyword and/or category extractor 608 evaluates the received base content to extract relevant keywords and/or categories that may be associated with the base content. For example, if a base content image of a single palm tree located on the extreme right side of an otherwise bare island is provided, the categories and or keywords extracted may include, "tropical", "island". "vacation", "beach", and "palm tree". The categories and keywords may then be associated with the metadata of the base content metadata editor 606. It is appreciated and understood by those skilled in the art that the keyword and/or category extractor 608 may be a computing device and/or an input provided by a human. Once the base content register 604 has evaluated and assigned the acceptable regions of the base content that the advertisement text can be positioned, and the keywords and/or categories have been extracted to aid in the contextual matching process, the base content is stored in a base content database 610. The base content database 610 stores the base content that has been registered by the base content register 604, wherein the stored base content will be extracted from the base content database 610 to generate a contextual-display advertisement. It is appreciated and understood by those skilled in the art that the base content register system 600 is an exemplary embodiment of the present invention and the various components depicted may or may not be incorporated in alternative embodiments.

Returning to FIG. 8 in which the contextual-display advertisement device 814 is comprised of a 3-way matcher 820. The 3-way matcher 820 extracts advertisement bodies from the advertisement text database 824 and base content from a base content database 826 based on the metadata associated with the advertisement bodies and the base content. The extracted advertisement bodies and base content are contextually or logically related to the page containing the advertising space that will display the contextual-display advertisement. Additionally, in an exemplary embodiment, the dimensional limitations of the advertising space is incorporated into determining which of the plurality of base content stored in the base content database 826 is extracted to be matched by the 3-way watcher 820. For example, if the advertising space has a dimension of 120×240, only those base content that are scalable or defined to be that size are extracted for use in the 3-way matcher 820.

As a further example, if the page is a webpage containing information on the island of Hawaii, the keywords associated with the page by the contextual delivery engine 816 may include "Hawaii", "island", and "vacation". The 3-way matcher may extract advertisement bodies and base content that have related or identical keywords. Therefore, continuing with the Hawaii webpage example, multiple advertisement bodies and base content that include the keywords "Hawaii", "island", and "vacation" are matched by the 3-way matcher to result in a list of potential advertisement bodies and base content that are contextually related and dimensionally appropriate for the advertising space. The matched advertisement bodies and base content are then merged to form an unprocessed advertisement. This is an advertisement that includes both the textual elements of the advertisement body and the visual elements of the base content such that the two are merged into a single visual advertisement. In an exemplary embodiment, the advertisement body and the base content that have the highest rated contextual relationship with the page will be used to form the contextual-display advertisement.

Figure 7:
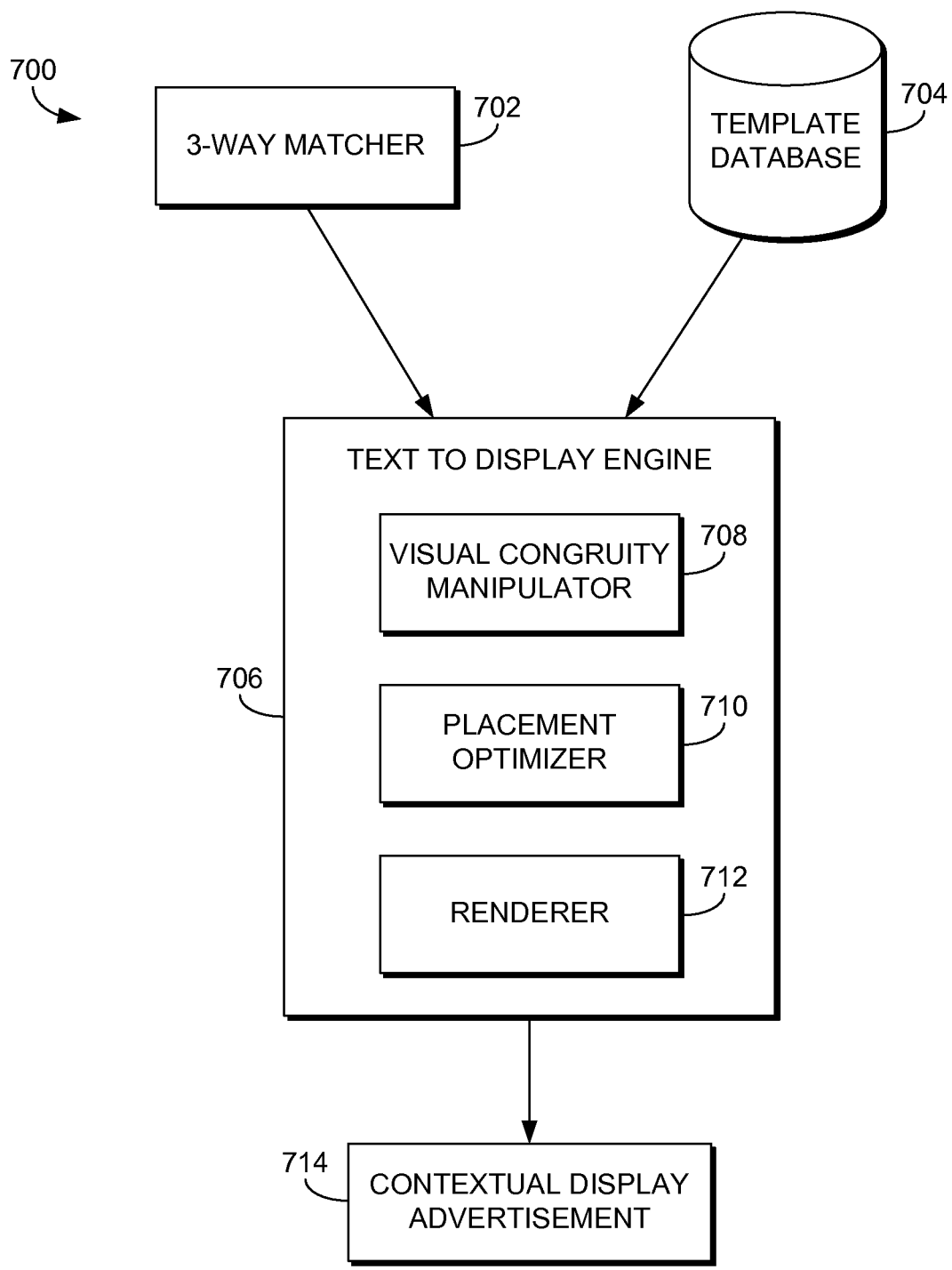
FIG. 7 is a block diagram of an exemplary text to display system, in accordance with an embodiment of the present invention.

In an exemplary embodiment, the contextual-display advertisement device 814 is further comprised of a text to display engine 822. The text to display engine 822 receives the matched advertisement bodies and base content which are then manipulated to result in a contextual-display advertisement. With reference to FIG. 7, a block diagram is shown that illustrates an exemplary system suitable for implementing embodiments of the text to display engine as shown and designated generally as text to display system 700, in accordance with an embodiment of the present invention. Text to display system 700 is comprised of 3-way matcher 702, template database 704, text to display engine 706, and a resulting contextual-display advertisement 714. The text to display engine 706 is comprised of a visual congruity manipulator 708, a placement optimizer 710, and a renderer 712.

In an exemplary embodiment, the 3-way matcher 702 provides matched advertisement bodies and base content that are contextually related and dimensionally correct to the advertising space of the page where the resulting contextual-display advertisement will be presented. The visual congruity manipulator 708 manipulates the advertisement text to provide consistency between the advertisement text and the base content. In an exemplary embodiment, this includes selecting the advertisement text and base content that produce the best or highest ranked combination. Examples of manipulating the advertisement text include changing the color, hue, tone, font, or other visual characteristics of the advertisement text to provide consistency between the text and the matched base content. In an alternative embodiment, the visual congruity manipulator 708 manipulates the advertisement text and base content to provide congruity or consistency between the unprocessed advertisement and the page that will present the contextual-display advertisement.

The text to display engine 706 is additionally comprised of a placement optimizer 710. The placement optimizer 710 utilizes templates from the template database 704 to optimize the placement of the advertisement text on the base content. The templates may be utilized if the content provider of the base content did not provide suggested placement regions or if the base content register did not supply the same. The placement optimizer 710 may use the metadata of the base content that indicates those regions of the base content that are suitable to place advertisement text, or it may also use the templates of the template database 704

The text to display engine 706 is also comprised of a renderer 712. The renderer 712 produces the contextual display advertisement from the advertisement text, the base content, and the conditions provided by the visual congruity manipulator 708 and the placement optimizer 710. In an exemplary embodiment, the renderer 712 merges the individual portions, such as the advertisement text and the base content, into a single unit that will be displayed as a contextual display advertisement 714. In an alternative exemplary embodiment of the present invention, the base content is merged with a logo as opposed to advertisement text. The merging of a base content and a logo provides an additional type of contextual display advertisement for an advertiser to utilize.

Returning to FIG. 8 in which the contextual-display advertisement device 814 is comprised of a template database 828. The template database is a database of the templates provided by the editor computing device 808. The template database, in an exemplary embodiment, is the template database 704 as represented in FIG. 7.

Figure 5:
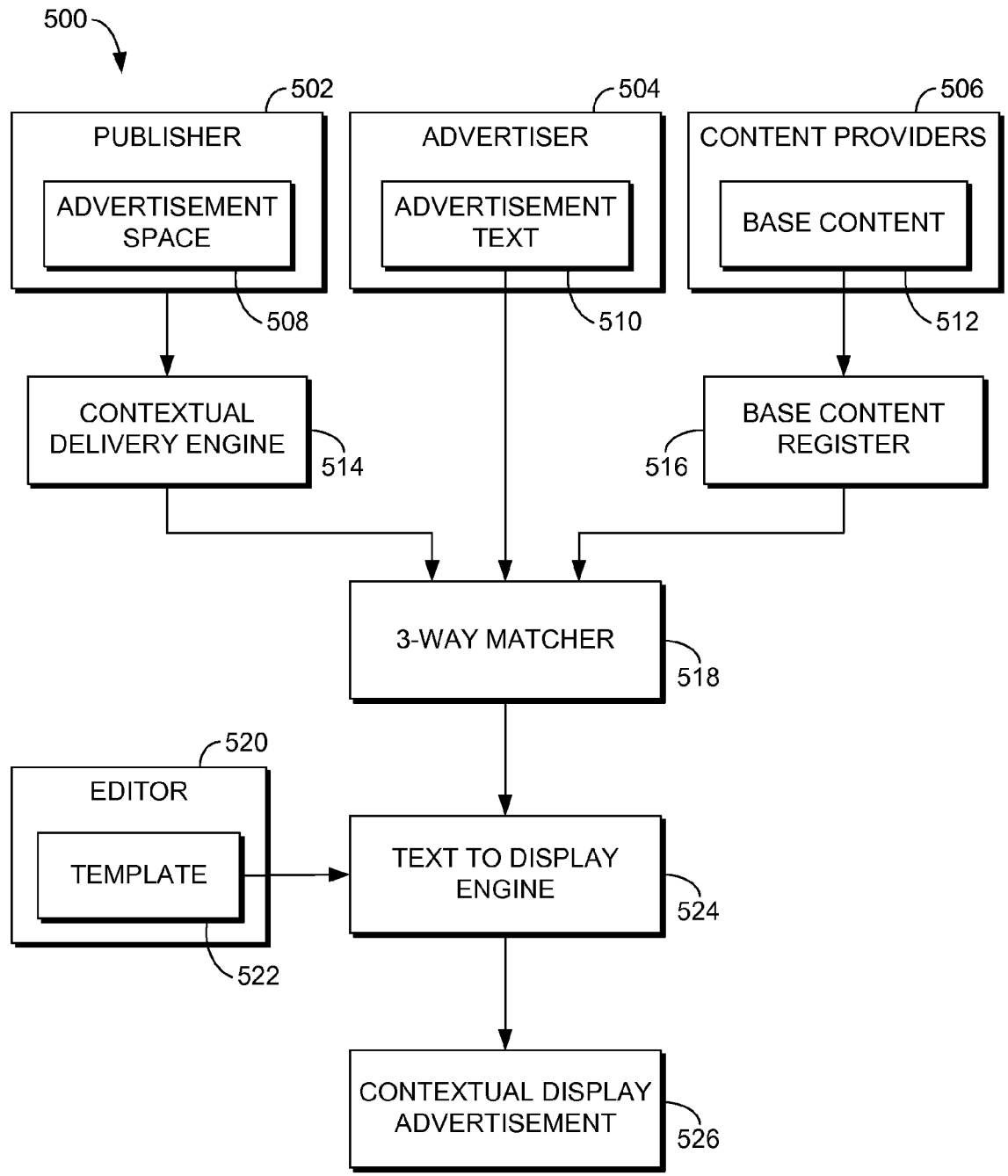
FIG. 5 is a block diagram of an exemplary contextual-display advertisement system, in accordance with an embodiment of the present invention.

With reference to FIG. 5, a block diagram is shown that illustrates an exemplary system suitable for implementing embodiments of the contextual-display advertisement system as shown and designated generally as contextual-display advertisement system 500, in accordance with an embodiment of the present invention. The contextual-display advertisement system 500 is comprised of a publisher 502 that provides a space for advertisements 508, an advertiser 504 that provides the text for an advertisement 510, a content provider 506 that provides the base content 512 that is used for a contextual-display advertisement.

The publisher 502 provides an advertisement space 508, such as a portion of a webpage, that the contextual-display advertisement will be displayed. A contextual delivery engine 514 evaluates and determines the context of the page where the advertising space 508 is located. In an exemplary embodiment, the contextual display engine associates keywords and/or categories with the page. The associated keywords and/or categories are used by the 3-way matcher 518 to pair advertisement text 510 with base content 512 that are contextually or logically related to one another and the page. The keywords and/or categories associated with the base content are provided by the base content register 516. These keywords and/or or categories associated with the base content are related to the appearance or visual characteristics of the base content. Wherein the provider of the content may manually assign the keywords and/or categories or an automated process may evaluate the content to determine the appropriate keywords and/or categories to associate with the base content. The advertisement text 510 also has keywords and/or categories associated with it. The keywords and/or categories for advertisement text may be associated by an advertiser who buys the rights to the keywords through a bidding process, or the keywords may be assigned through a contextual or logical relationship of the text of the advertising text.

An editor 520 develops templates 522 that aid in the optimization of the placement of advertising text on base content. The templates 522 may supplement suggested text placement regions provided by the content provider, or the templates 522 may dictate the text placement of the advertising text on the base content. The 3-way matcher 518 provides advertising text and base content to the text to display engine 524. The text to display engine 524 manipulates the visual characteristics of the advertisement text and/or the base content to provide visual congruity among the advertisement text, the base content, and the page. Additionally, the text to display engine 524, in an exemplary embodiment, applies a template 522 to optimally position and locate the textual elements provided by the advertising text onto the base content such that the resulting combination appears to have been created with each other in mind. Increasing the visual congruity between the advertisement text and the base content provides the impression that the merger of the two was always intended and done by a professional graphic artist. The difference is that the placement optimization and visual congruity manipulation, in an exemplary embodiment, are done in real-time. The merged advertisement text and base content are merged as one advertisement and then rendered into a form that is presentable to an end-user viewing the page. The rendered advertisement is the contextual-display advertisement that is contextually related to the page on which the advertisement appears.

While the contextual-display advertisement may associate one advertisement text with a particular base content a first time, the next instance of the page requesting a contextual-display advertisement may result in a different combination of advertisement text and base content. For example, if a webpage for Hawaii has an advertising space that is to be populated with a contextual-display advertisement, the first population instance may include advertisement text for a sun-tan lotion and a base content image that visually depicts a beach scene. The next time the same Hawaii webpage requests a contextual-display advertisement to populate the advertisement space the same sun-tan lotion advertisement text may be associated with a base content image of a sailboat. It is understood and appreciated by those skilled in the art that the plurality advertisement bodies and the plurality of base content that are available to create a contextual-display advertisement may be used in any and all combinations.

With reference to FIG. 2, a flow diagram is shown that illustrates an exemplary method for creating a contextual-display advertisement and designated generally as contextual-display advertisement method 200, in accordance with an embodiment of the present invention. The context of a page is determined as indicated at block 202. One or more advertisement text(s) are extracted from a database of advertisement texts as indicated at block 204. One or more images are extracted from a database of base content as indicated at block 208. The extraction of advertisement text and images, in an exemplary embodiment are determined based on the context of the page and the keywords and/or categories associated with each of the advertisement text and the image. The advertisement text and the image that are extracted from their respective database are then merged to form a merged advertisement. In an exemplary embodiment, the merged advertisement is the combination of the advertisement text and the base image such that the resulting merged advertisement is a single unit. The merged advertisement is rendered to create a contextual-display advertisement that will be presented in the advertising space of the contextually related page as indicated at block 210.

With reference to FIG. 3, a flow diagram is shown that illustrates an exemplary method for creating a contextual-display advertisement and designated generally as contextual-display advertisement method 300, in accordance with an embodiment of the present invention. A request for a contextual-display advertisement is received as indicated at block 302. The context of the page on which the contextual-display advertisement will be presented is determined as indicated at block 304. An advertisement body is merged with a base content to form an unprocessed advertisement as indicated at block 306. In an exemplary embodiment an unprocessed advertisement is one that has not been refined or manipulated to optimize placement and visual congruity among the elements that comprise the unprocessed advertisement. Additionally, in an exemplary embodiment, the advertisement body and the base content are both contextually or logically related to the determined context of the page. The visual characteristics of the page are evaluated as indicated at block 308. The visual characteristics may include, but are not limited to, the font type, font color, font style, page colors, page styles, and page object format. The visual characteristics of the unprocessed advertisement are adjusted as indicated at block 310. In an exemplary embodiment, the visual characteristics of the advertisement body are manipulated to provide visual congruity between the base content and the advertisement body. In an exemplary embodiment, the visual characteristics of the unprocessed advertisement are adjusted to provide visual congruity between the unprocessed advertisement and the page. The adjustment of the visual characteristics may include location optimization and or visual congruity adjustments.

Figure 4:
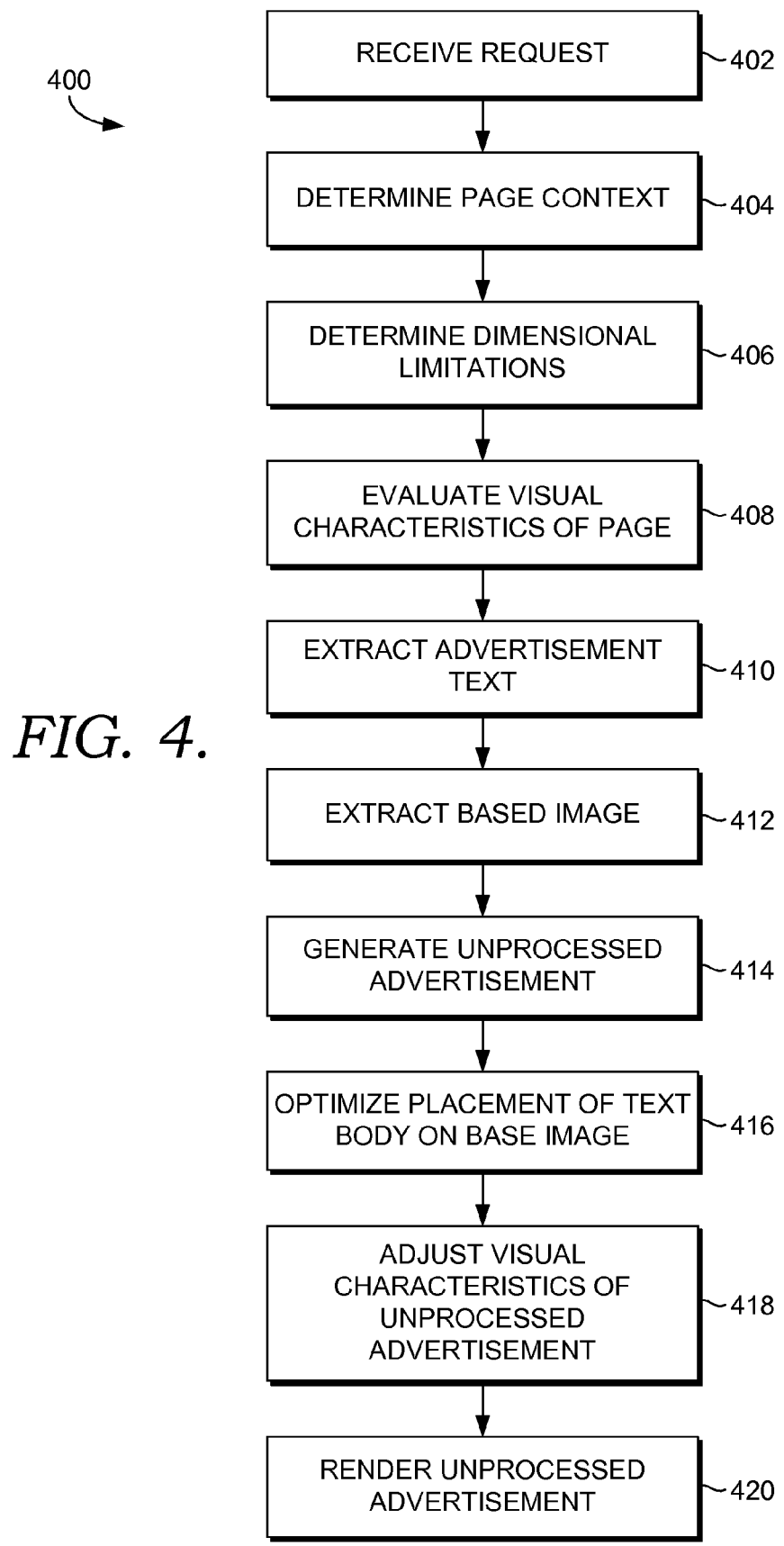
FIG. 4 is a flow diagram of an exemplary method for creating a contextual-display advertisement, in accordance with an embodiment of the present invention.

With reference to FIG. 4, a flow diagram is shown that illustrates an exemplary method for creating a contextual-display advertisement and designated generally as contextual-display advertisement method 400, in accordance with an embodiment of the present invention. A request is received for a contextual-display advertisement as indicated at block 402. The context of the page is determined as indicated at block 404. Dimensional limitations of the advertising space are determined as indicated at block 406. The dimensional limitation may include height and width requirements or ration requirement for the contextual-display advertisement that will populate the advertising space of the page requesting the contextual-display advertisement. The visual characteristics of the page are determined as indicated at block 408. An advertisement text is extracted from a database of advertisement texts as indicated at block 410. A base image is extracted from a database of base images as indicated at block 412. An unprocessed advertisement is generated from the merging of the advertisement text and the base image as indicated at block 414. The placement of the advertisement text on the base image is optimized as indicated at block 416. The visual characteristics of the unprocessed advertisement are adjusted as indicated at block 418. The unprocessed advertisement is rendered to create a contextual-display advertisement that is to be presented in the advertising space on the page that requested the contextual-display advertisement as indicated at block 420.

What is claimed is:

1. One or more computer storage media devices comprising computer-executable instructions embodied thereon that, when executed by one or more processors of a computing device, cause a computing system to perform:
   receiving, utilizing a first computer process, a request for a contextual display advertisement to be provided to a page;
   merging, utilizing a second computer process, one of a plurality of advertisement bodies with one of a plurality of base contents to form an unprocessed advertisement, wherein the unprocessed advertisement contextually relates to the page; and
   adjusting, utilizing a third computer process, visual characteristics of the unprocessed advertisement to provide congruity between the page and the unprocessed advertisement to create a contextual-display advertisement, wherein the first, second, and third computer processes are executed by one or more computing devices.

2. The one or more computer storage media devices of claim 1, further comprising instructions that when executed by the computing system apply a template to the unprocessed advertisement to adjust the position of the one of a plurality of advertisement bodies over the one of a plurality of base contents.

3. The one or more computer storage media devices of claim 1, further comprising instructions that when executed by the computing system adjust the dimensional size of the unprocessed advertisement.

4. The one or more computer storage media devices of claim 1, wherein the one of a plurality of advertisement bodies and the one of a plurality of base contents have a keyword and/or category that is related.

5. The one or more computer storage media devices of claim 1, wherein the one of a plurality of base contents is a specified dimensional size.

6. The one or more computer storage media devices of claim 1, wherein the creation of the contextual display advertisement is in real-time.

7. One or more computer storage media devices comprising computer-executable instructions embodied thereon that, when executed by one or more processors of a computing device, cause a computing system to perform:

receiving, utilizing a first computer process, a request for a display advertisement to be displayed on a page in an advertisement space;

analyzing, utilizing a second computer process, keywords on the page to determine the context of the page, wherein the context of the page is classified into one or more keywords and/or categories;

extracting, utilizing a third computer process, at least one advertisement text body from a plurality of advertisement text bodies, wherein the at least one advertisement text body is logically related to the context of the page;

extracting, utilizing a fourth computer process, at least one base image from a plurality of base images, wherein the at least one base image is logically related to the context of the page and the at least one base image is scalable to satisfy the dimensional limitations of the advertisement space;

generating, utilizing a fifth computer process, at least one unprocessed advertisement, wherein the at least one unprocessed advertisement is the combination of the at least one base image and the at least one text body;

optimizing, utilizing a sixth computer process, the placement of the at least one text body in relation to the at least one image base of the at least one unprocessed advertisement with a placement template;

adjusting, utilizing a seventh computer process, the visual characteristics of the at least one unprocessed advertisement to increase the visual congruity between the page and the at least one unprocessed advertisement; and rendering, utilizing an eighth computer process, the unprocessed advertisement to create a contextual-display advertisement, wherein the first, second, third, fourth, fifth, sixth, seventh, and eighth computer processes are executed by one or more computing devices.

* * * * *